US005460702A

United States Patent [19]
Birkbeck et al.

[11] Patent Number: 5,460,702
[45] Date of Patent: Oct. 24, 1995

[54] APPARATUS AND METHOD FOR THE PURIFICATION OF WATER

[75] Inventors: Paul J. Birkbeck, Pinellas Park; Todd A. Gregorcic, Largo, both of Fla.

[73] Assignee: NOGSYS Technology, Inc., Largo, Fla.

[21] Appl. No.: 220,004

[22] Filed: Mar. 30, 1994

[51] Int. Cl.[6] ........................... C02F 1/467
[52] U.S. Cl. .................. 204/149; 204/152; 204/269; 204/270; 204/276; 204/277; 204/293
[58] Field of Search .................. 204/149, 152, 204/276, 269, 270, 277, 293, 294

[56] References Cited

U.S. PATENT DOCUMENTS

| | | | |
|---|---|---|---|
| 3,900,377 | 8/1975 | Enns et al. | 204/149 |
| 4,472,257 | 9/1984 | Skylarov et al. | 204/290 R |
| 4,676,878 | 6/1987 | Chez | 204/101 |
| 4,773,977 | 9/1988 | Houle et al. | 204/197 |
| 4,839,007 | 6/1989 | Kötz et al. | 204/149 |
| 4,874,509 | 10/1989 | Bullock | 210/169 |

*Primary Examiner*—John Niebling
*Assistant Examiner*—Arun S. Phasge
*Attorney, Agent, or Firm*—Thomas P. Liniak

[57] ABSTRACT

A method and apparatus for purifying water is provided for use in both recreational and industrial settings. The present invention significantly lessens or eliminates the need to use toxic chemicals in the purification process and achieves purification by altering the molecular structure of the water to free radical forms of oxygen.

17 Claims, 4 Drawing Sheets

APPARATUS AND METHOD FOR THE PURIFICATION OF WATER

BACKGROUND OF THE INVENTION

This invention relates to the purification or sanitization of water. More particularly, the present invention relates to a method and apparatus for the purification of water contained in recirculating water systems. The present invention purifies water for drinking, recreational or industrial use, in a manner that significantly lessens or eliminates the need to use toxic chemicals in the purification process. The purification of water for these purposes has presented problems for many decades. Significant problems such as destruction of equipment and serious illness can result from use of unsanitized or improperly purified water.

The need for systems that provide adequate purification of water has increased to cover a broad range of applications. In addition to the provision of potable water, some other applications include purification of pools, spas, air conditioning and cooling towers, industrial waste and contaminated supplies of water. In order to meet these varied needs, a number of known systems and methods have been developed. Each of these known purification systems or methods, however, has presented some rather serious drawbacks. Specifically, although each of these systems has proven to be at least somewhat effective in the sanitization of water, they introduce additional problems as a by-product of their purification processes. These secondary problems are at times equal or greater in severity than the initial purification problem that they are designed to solve. Prior art water purification systems fall into three major categories: chemical based systems; copper ionization systems; and, ozone generating systems.

In almost all instances where sanitizing of water is accomplished by chemical based systems, significant amounts of chlorine and/or bromine are used. Consumers and those in the industry are becoming increasingly aware of the dangers of using chlorine and bromine based chemicals. For example, although many are under the perception that swimming pool water that is treated with chlorine or bromine based chemicals is safe and germ free. In most all cases, however, this is not correct. The chlorine and bromine based chemicals have only had limited success in eliminating or controlling certain prevalent forms of bacteria. Also, such chemical systems are also dramatically affected by the ultraviolet light and heat which bodies of water are frequently exposed to. This makes it difficult to achieve a continuous optimum level of chemicals in a body of water exposed to such elements.

In addition, water treated with such chemicals introduces other problems. For example, the quality of chlorine treated water in a pool usually introduces a strong odor, a bleaching effect and irritation or potential infection of mucus membranes and other body parts that may be exposed to such treated water. These problems result either from the presence of relatively high levels of such chemicals or the continued presence of bacteria that is unaffected by such chemicals. Even more importantly, the use of chlorine type chemicals in purification processes can generate harmful by-products. The result can be the creation of highly toxic gasses such as chlorine or chloroform, that are classified as carcinogens.

These drawbacks are further magnified by the fact that the organisms that are desired to be eliminated by such systems consume chemicals during the purification process. This requires a great deal of expense in connection with the continual purchase and use of large amounts of such chemicals, in order to maintain the body of water at a desired level of purification. Furthermore, in industrial applications such as cooling towers, pasteurizers, homogenizers, chillers, boilers and water storage tanks, well tanks and well heads, not only can chemical based water purification systems be expensive to use as stated above, but also can lead to the destruction of plant or other plumbing systems or plumbing apparatus over extended periods of time.

A second type of generally known water purification system is copper ionization. Although known copper ionization systems can provide fairly reasonable results in terms of water purification, these types of systems likewise present a number of drawbacks in terms of side effects and maintenance. Copper ion purification systems dispense metal ions into the water that result in undesired staining of pools and the like that contain the water. Copper ion systems are also rather slow acting in achieving a desired purification result. In addition, copper ion systems must be used in conjunction with the previously mentioned chemical based purification systems. These systems require constant shocking of the water to be purified and considerable more attention to pool chemistry and still require large amounts of chemicals to be used in conjunction with the copper ionization system.

Another type of known water purification system involves the creation of ozone gas to electrically transform the water to kill algae and bacteria and aid in the reduction of organics in the water. Such systems offer reasonably effective results in the purification of water, but, again, carry a number of negative factors with those results. In particular, these systems require the creation of ozone at the outset of the purification process. This requires very large amounts of electricity to power an ultraviolet light source or corona discharge elements that create the ozone. The ozone can be harmful to any people in the area if it is released into the environment surrounding the water. This problem is further compounded by the fact that ozone gasses generally sit between the lighter air and the heavier water in the area just above the surface of the water that would be often occupied by those using a pool, spa or similar water facility.

It is apparent from the prior art that a need exists for an additional method and apparatus for the purification of water that provides purification results that are, at a minimum, comparable to existing systems and that are more cost effective and do not suffer from the problems or drawbacks of existing prior art systems.

SUMMARY OF THE INVENTION

In order to overcome the difficulties presented by the prior art and to permit comparable results in the purification of water, it has been found that surprisingly effective results are achieved by a method and apparatus for the purification of water that takes germ laden water and turns the water itself into its own sanitizer, simply by altering its molecular structure from water into free radical forms of oxygen which are lethal to algae and bacteria and also aid in the reduction of organics in water. In this manner, the present invention allows either the complete elimination of the need to use existing chemical purifications systems, or a significant reduction of chemical usage to a small fraction of what is required in chemical systems alone, without the use of copper ionization or the need to form a potentially harmful ozone during the process.

Accordingly, it is an object of the present invention to significantly eliminate the problems and drawbacks of the prior art, while providing comparable water purification results.

Another object of the present invention is to accomplish water purification without the creation of ozone.

Yet another object of the present invention is to provide water for a purification system that is capable of purification utilizing either no or a small portion of chemicals that are utilized by existing chemical purification systems.

A further object of the present invention is to provide such a water purification systems that can be used to purify water for drinking, recreational and/or industrial use.

A still further object of the present invention is to provide the creation of free radical forms of oxygen that are lethal to algae and bacteria on contact.

A still further object of the present invention is to provide a water purification system that can be easily adopted into the filter lines of existing recirculating water systems.

These and other objects are satisfied by a method and apparatus for purification of water in recirculating water systems having a power supply capable of converting an AC power source to a low voltage DC power supply and an electrode assembly connected to and activated by said power supply. The electrode assembly further comprises a pair of electrodes of carbon and ceramic ash in spaced parallel relationship with an electrical charge that flows between them, thereby creating oxygen radicals in any water that contains the electrodes.

These and other objects of the invention will become more apparent as the following description proceeds, especially when considered with the accompanying drawings.

DETAILED DESCRIPTION OF THE INVENTION

As will be described in more detail below, the present invention comprises a device that is capable of taking germ laden water and turning that water into its own sanitizer. This process is accomplished by altering the molecular structure of water into free radical forms of oxygen such as hydroxyl radicals, atomic oxygen, hydrogen peroxide and oxygen, which act to perform sanitization of pathogens on contact, as well as most known forms of bacteria and algae. The present invention accomplishes this result in a manner that reduces or eliminates use of toxic chemicals in water treatment, significantly lessens the electrical consumption and the need to generate ozone, and also does not dispense metal ions into water systems that could lead to staining.

Figure 1:
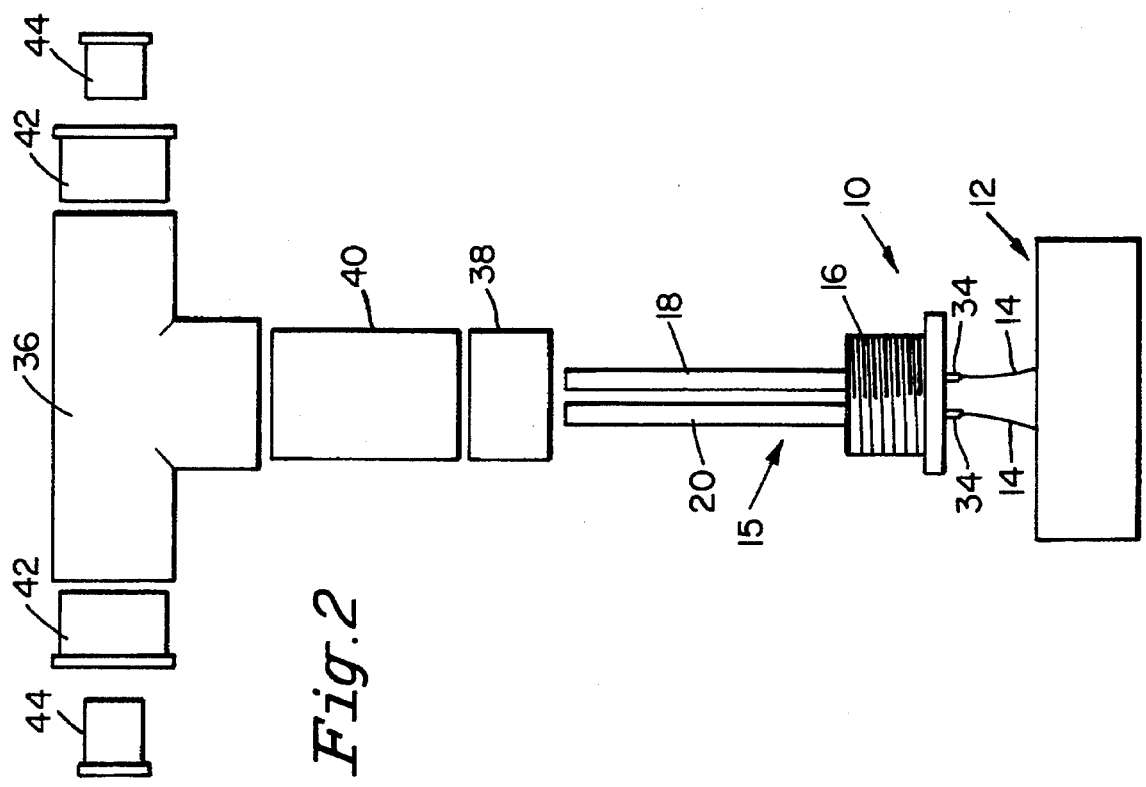
FIG. 1 is a partial x-ray plan view of an embodiment of the present invention designed for use in connection with small bodies of water positioned in a contact chamber.
Figure 2:
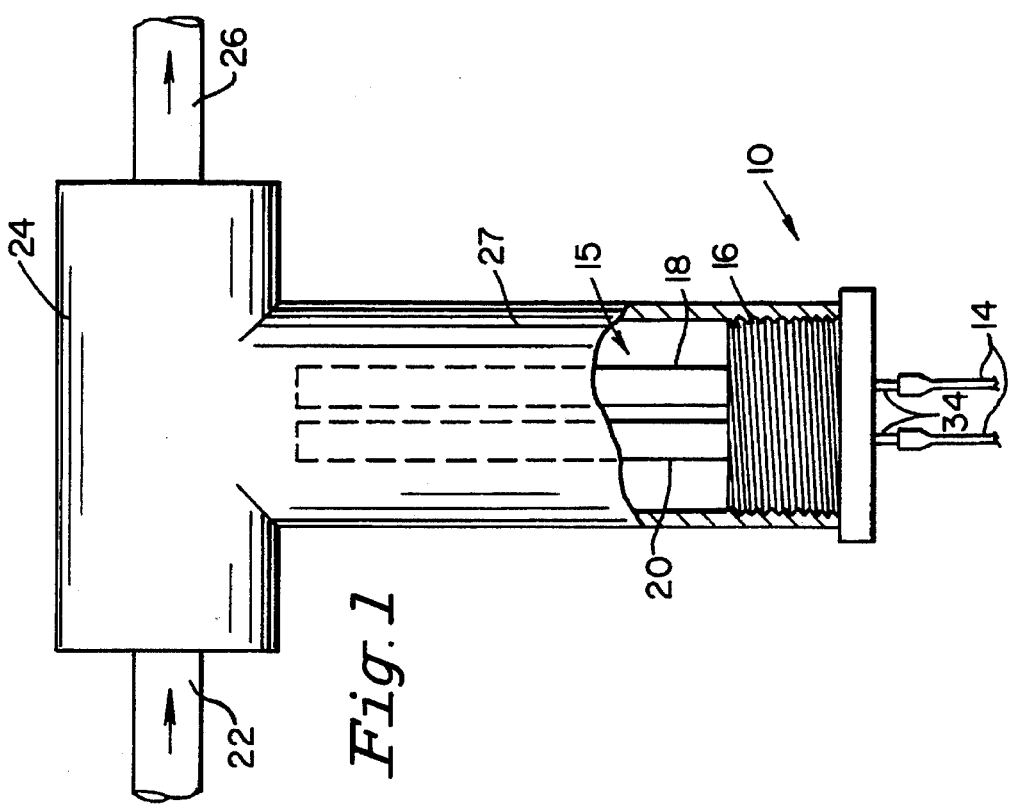
FIG. 2 is an exploded schematic view of an alternative contact chamber and one embodiment of the present invention.

Referring now to FIGS. 1 and 2, an embodiment of device 10 for the purification of water in accordance with the present invention is illustrated along with its component details. Device 10 is particularly preferred for use in connection with bodies of water having recirculation systems. Device 10, in its most elemental form, is comprised of an electronic power supply 12 and an electrode assembly 15 that is connected to the power supply 12 by connecting elements 14 and bolts 34. The connecting elements can be any known electrical wiring or the like that is capable of safely carrying the current required by the present invention.

Figure 4:
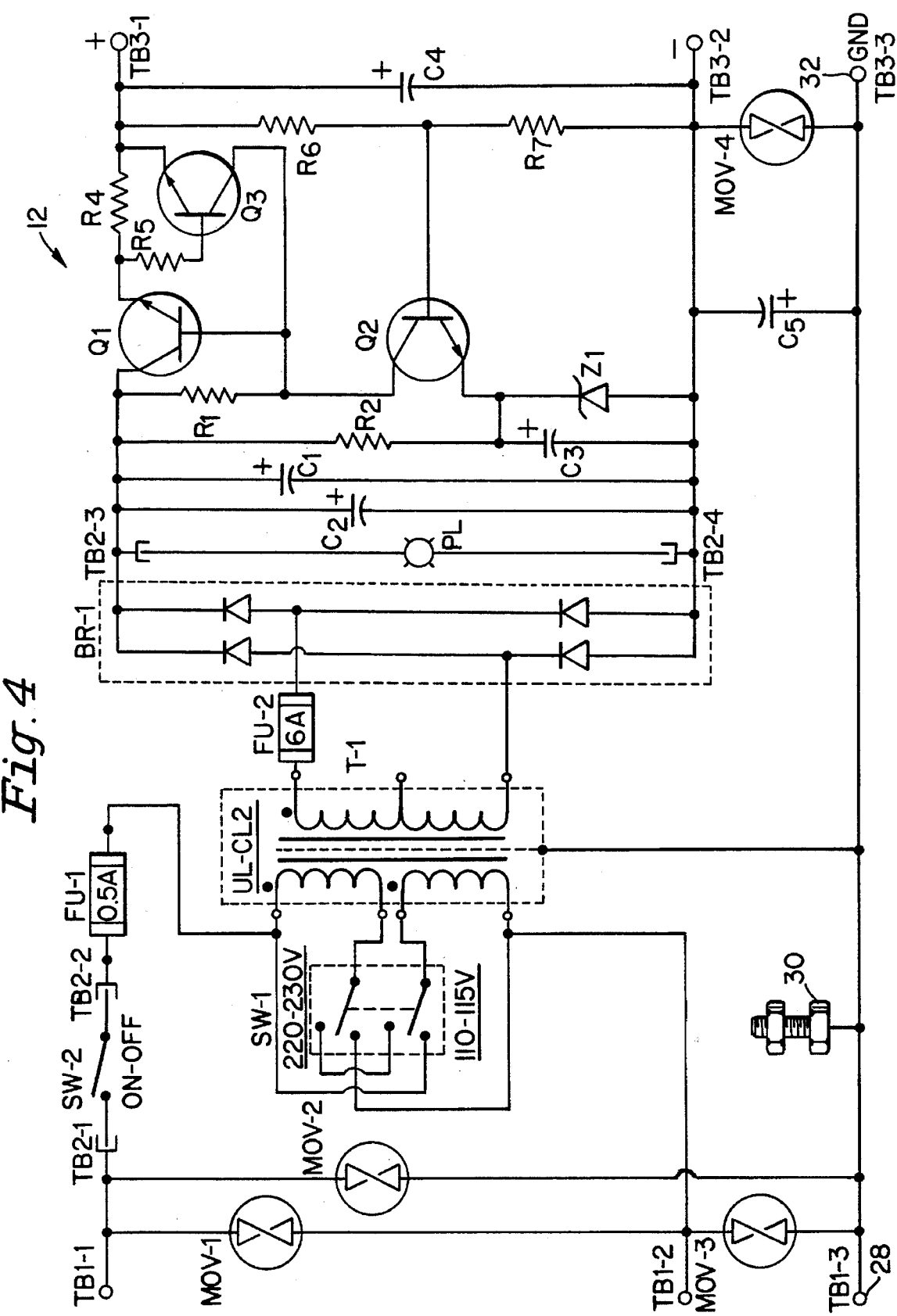
FIG. 4 is a circuit diagram of a preferred AC to DC analog power supply used to stimulate the electrodes of the present invention.

The power supply 12 can be of any known design that is capable of receiving either a standard household 110 or 220 volt alternating current (AC) source and is capable of converting the AC power source to direct current (DC) power. The power supply 12 must be capable of supplying a nominal charge of 10 volts DC at 2.5–4.4 amps to the electrode assembly 15 through the connectors 14 and bolts 34. The power supply is analog in design with no variable power control. It is preferable that the power supply 12 have numerous grounding features to increase its safety, given the fact that it is used near water and in a water purification system. A schematic circuit diagram of a particularly preferred AC to DC power supply is illustrated at FIG. 4. It should be noted that this particular power supply 12 has numerous grounding features, as illustrated at 28, 30 and 32 of FIG. 4, to provide an increased level of safety during operation.

The electrode assembly 15 of the present invention comprises a pair of electrodes 18 and 20 respectively in spaced parallel relationship with each other, end cap 16 and bolts 34. The electrodes 18 and 20 are held in this manner at one end by a device such as end cap 16 which permits easy installation and removal of the electrode assembly 15 into existing filter lines or water recirculation systems. The cap 16 can be constructed of various materials, but is preferably made of ABS, PVC or stainless steel and is likewise preferably threaded so as to provide assistance in securing it to recirculation systems or filter lines as illustrated in FIG. 2.

As previously indicated, electrodes 18 and 20 are provided with low voltage DC current from power supply 12 through connectors 14 and bolts 34. The electrodes 18 and 20 are fitted into the inner diameter of the cap 16 and are cemented using a non-conductive epoxy. Any of the numerous commercially available epoxies that are also not chemically reactive or water soluble can be used for this purpose. The electrodes 18 and 20 are furthermore each tapped and fitted each with a stainless steel threaded bolt 34. These bolts 34 protrude through the cap 16 so that an electrical contact from the power supply 12 may be made through connectors 14.

The electrodes 18 and 20 of the present invention are likewise rather important and unique in their construction. The length, width and thickness of the electrodes 18 and 20 will vary with the number of gallons of water to be purified in a given application. A preferable electrode configuration is illustrated in FIGS. 1 and 2. As an example, electrodes that measure 10" in length, 2" in width and have a thickness of approximately 0.5", have been found particularly preferable for use in connection with the purification of small bodies of water (between 1,000 and 50,000 gallons).

The electrodes 18 and 20 are constructed of a carbon and ceramic ash composite. This material is very important to the present invention since this composite is highly conductive, but totally non-reactive. This composition is much more durable and long lasting in an electrically active aqueous environment that other materials previously used for such purposes, such as platinum coated metals. Since the preferred carbon ceramic ash composite has a 20% porosity, the surface area of the electrodes is greatly increased, which in turn increases the output of positive sanitizing attributes being produced by the device 10. An industrial grade of this composite is preferred for use as electrodes 18 and 20. A particularly preferred composition contains about 80% carbon and about 20% ceramic ash. It should be understood that other combinations of carbon and ceramic ash materials could be used, while still achieving the benefits of the present invention. For example, in addition to 580 grade carbon, 250, 2000, 2016, 2020 and 2025 grade carbon or carbon ash compositions could also be used.

The operation of device 10 will now be described in connection with the embodiment set forth in FIG. 1. Electrode assembly 15 is first inserted into a contact chamber 24. The assembly can be secured to the chamber by cementing the cap 16 to portion of the inner surface of the chamber 24 and/or by providing a threaded outer surface on the cap 16 that engages a complementary surface inside of the chamber 24. The chamber 24 is located in the return line of a water flow or recirculation system. The electrode assembly 15 is connected to the power supply 12 as previously described in detail.

Water is supplied to the contact chamber 24 by the water supply line 22. The water supply line 22 is smaller in diameter than the contact chamber 24, in order to slow down the flow of water and promote a longer contact time of the water that is being oxygen enriched by the device 10 of the present invention. Accordingly, it is preferred that the water supply line of the present invention be on the order of 1 ½" to 2" in diameter, while the contact chamber is 2" to 4" in diameter. It should be understood that these diameters could vary in accordance with the present invention, depending upon the flow rate and type of water purification to be achieved.

The geometry of the contact chamber with its vertical chamber 27 also serves to promote a longer contact time between water and the electrodes 18 and 20. With the electrodes placed in a vertical chamber 27 of the contact chamber 24, low voltage DC current is passed between the electrodes 18 and 20. This creates an electrical field between the electrodes 18 and 20 where water molecules that pass between them or contact them are molecularly stimulated and separated into their key elemental forms, free radical oxygen and hydroxyl radicals. The longer the contact time, the more oxygen radicals are produced, as well as increasing the potential of generating high oxidation reduction potentials (ORP).

A nominal charge of 10 volts DC at 2.5 to 4.4 amps is supplied through the electrodes 18 and 20. The result is a 10 volt (nominal) charge flowing between the electrodes 18 and 20. This results in the creation of oxygen radicals (hydroxyl radical, hydroxide ion, hydrogen peroxide and oxygen as $O_2$). The present invention therefore produces and utilizes the second, third, fifth and ninth most powerful oxidative agents known. These oxidants are lethal to bacteria and algae spores. Where, as in the present invention, a 10 volt charge creates a 10,000 millivolt charge in the water in the chamber 27, this results in the instant killing of all pathogens in the chamber 27 since the oxygen radicals are lethal to bacteria and algae spores. These oxygen radicals also aid in the reduction of organics in the pool water.

The water that has been purified in accordance with the device 10 of the present invention subsequently returns to its source through water return line 26 which is likewise of smaller diameter than the contact chamber 24, in order to promote longer contact time of the water in the chamber 24 with the electrodes 18 and 20. The oxygen radicals created in the chamber 24 then continue to assist in oxidation and disinfection since the flow rate of water through the return line 26 carries these radicals back to the body of water. In this manner, the present invention provides for the sanitization and oxidation of water in a water recirculation system that utilizes standard household current and requires only a low voltage DC current to be converted from the alternating current power supply.

It has been found, for example, that the present invention used in connection with existing pool filtering system that utilizes the flow rate of filtering the contents of the pool at least twice in a 24 hour period can eliminate up to approximately 90% of the need for use of chemical usage as part of the purification system. Utilized in this manner, the present invention enables the use of approximately 8 oz. of bromine in tablet form per 15,000 gallons of water every 7 to 10 days, to provide 0.2 to 0.4 ppm, reducing dramatically both the cost and problems associated with chemical purification systems. Existing chemical purification systems recommend a level of chlorine or bromine of about 3 to 5 ppm. It has also been found that chemical usage could potentially be eliminated if the water was recirculated more than two times per day. It should be understood that the method and device of the present invention can be used in connection with any type of water flow or recirculation system. These include, for example, but are by no means limited to, pools, spas, cooling towers, pasteurizers, homogenizers, chillers, boilers, storage tanks, well tanks, hot tubs, saunas, home water systems, canneries, bottleries, waste water treatment systems, sewer systems and water storage systems.

Referring now to FIG. 2, utilization of device 10 is illustrated in connection with a standard tee type fitting 36 found in many existing recirculating water lines. Device 10, operating in the same manner as described in detail above, can be connected to such a tee fitting 36 with the use of an adaptor 38 and pipe 40 made preferably of PVC or a similar material. In addition, restrictions on the water flow both into and out of the tee fitting 36, can be accomplished by the use of one or more of reducers such as reducers 42 and 44.

Figure 3:
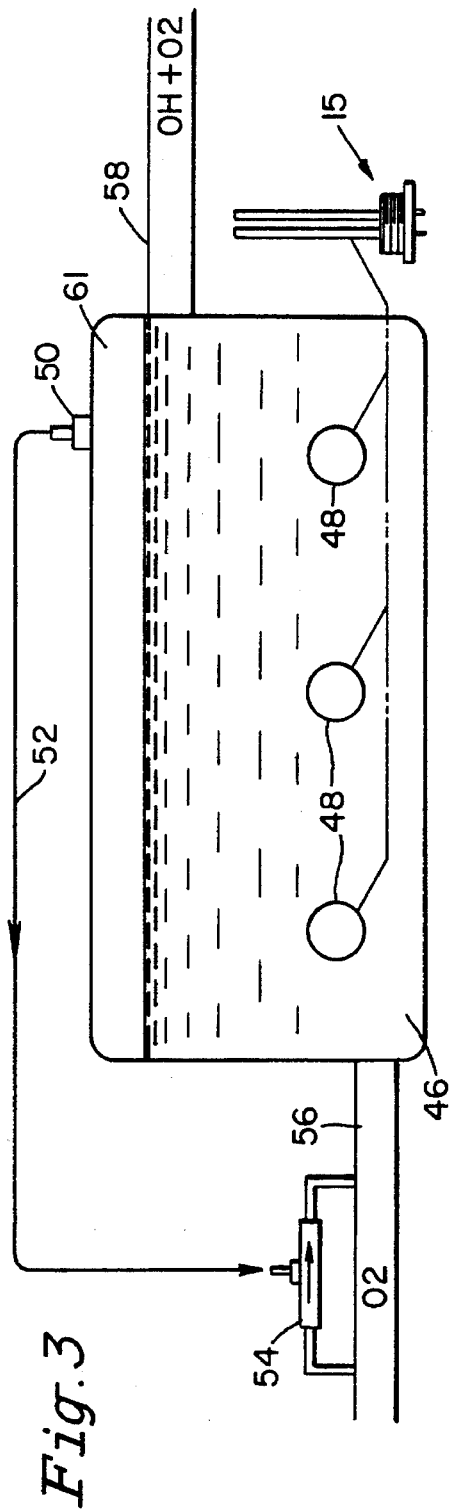
FIG. 3 is a side schematic view of another embodiment of the present invention designed to purify larger bodies of water and providing for oxygen removal and reintroduction.

The present invention can also be utilized in connection with significantly larger bodies of water than previously described. FIG. 3 illustrates another embodiment of the present invention that is particularly useful in connection with bodies of water that are over 20,000 gallons. In these type of applications, an infusion tank 46 is provided in the water recirculation line that is generally between 30 and 200 gallons, although it could be smaller or larger, depending upon the particular application. The tank 46 is provided with a plurality of ports 48 that allow the introduction and accommodation of multiple devices 10 such as have been previously described. Ports 48 are designed in conjunction with devices 10 to be secured by threaded engagement or similar means so that it is rather a simple matter to insert and remove devices 10 for the purposes of inspection, maintenance or replacement.

In accordance with this embodiment of the present invention, tank 46 is provided with an oxygen exit opening 50 and oxygen vacuum line 52 that removes and reintroduces all undissolved oxygen back into the pretank water supply line 56 through injection system 54 such as a Mazzei venturi principle injector. The purpose of this is to take the oxygen trapped above the discharge level into the tank 46 and turn it into dissolved desirable by-product and to do so repeatedly until all oxygen gas has been thoroughly dissolved into desirable by-product in order to increase the effectiveness of the water sanitization.

In operation, it is assumed that water entering the tank from supply line 56 will take the path of least resistance and ultimately evacuate itself into a return line 58 where all oxygen in the return line is 100% dissolved. This shall cause a cavitation effect in the area 61 above the return line and be a venting area for unmixed, undissolved oxygen. The gasses will then be evacuated from the area 61 back into the return line 52 and be introduced into the supply line 56 prior to reaching the tank 46 for a second pass at mixing and creating dissolved oxygen. In theory, this reintroduction of gasses should take place over and over again until a suitable mix is accomplished. The potential for water to fill the cavity area 61 is minimal. However, should that take place, a simple corrective measure of moving the return line 58 further down on the tank 46 would remove the chance of that creating any further problems. The cost of this degassing system would be minimal and, could also be used in connection with ozone generating purification systems. This degassing system could safely reintroduce and thereby eliminate ozone in pools between, for example, 15,000 to 20,000 and on all bodies of water where ozone off gassing is a concern.

Figure 5:
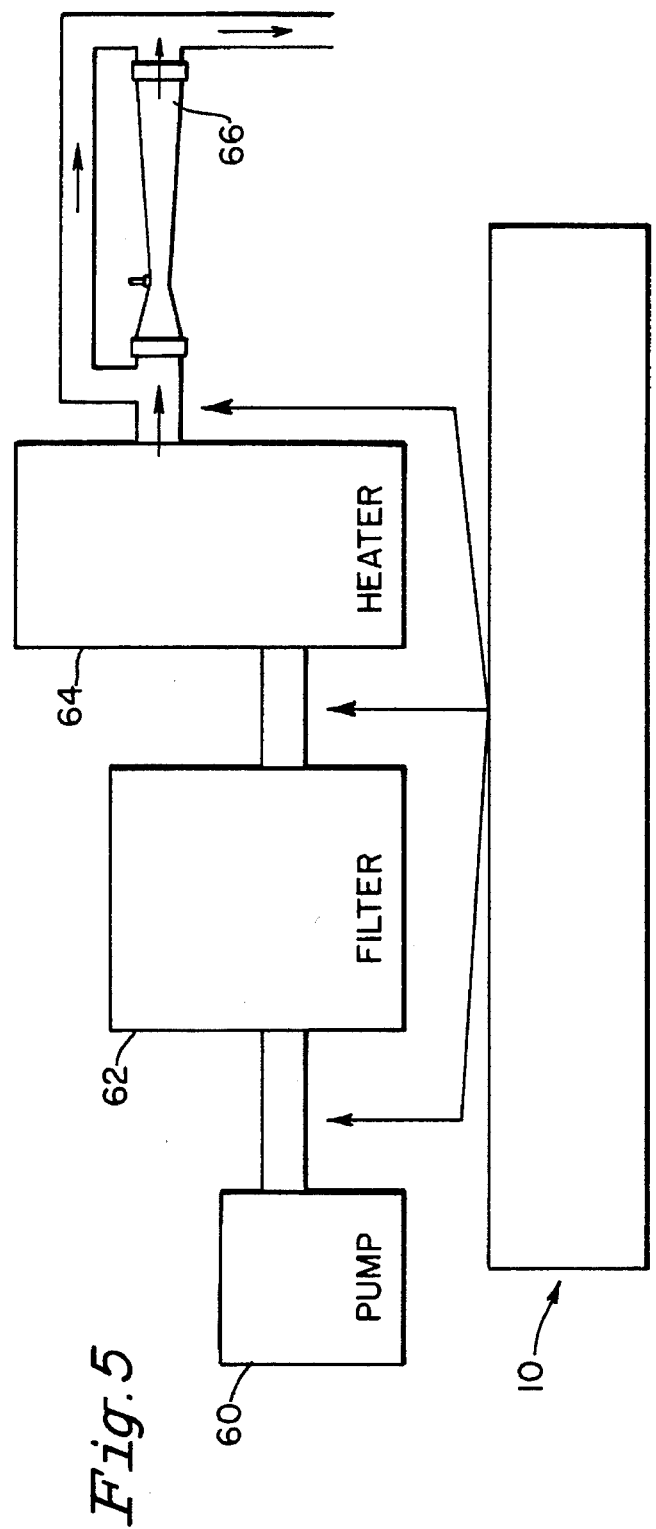
FIG. 5 is a block diagram indicating the preferred positioning of the embodiment of the present invention to be used in connection with small bodies of water.

Turning now to FIG. 5, placement sites for the embodiment of the present invention that utilizes a single device 10 are indicated in connection with a recirculating water system such as a pool or the like. As can be seen, device 10 and a chamber such as chamber 24 can be placed between pump 60 and filter 62, between filter 62 and heater 64, or between heater 64 and venturi oxygen injector 66. It is also important to note that device 10 will frequently be used in connection with a venturi type oxygen injector such as illustrated at 66. This enhancement introduces oxygen which aids in oxidation and sanitization by the invention as described as well as inhibiting algae growth by displacing the carbon dioxide in the body of water.

Figure 6:
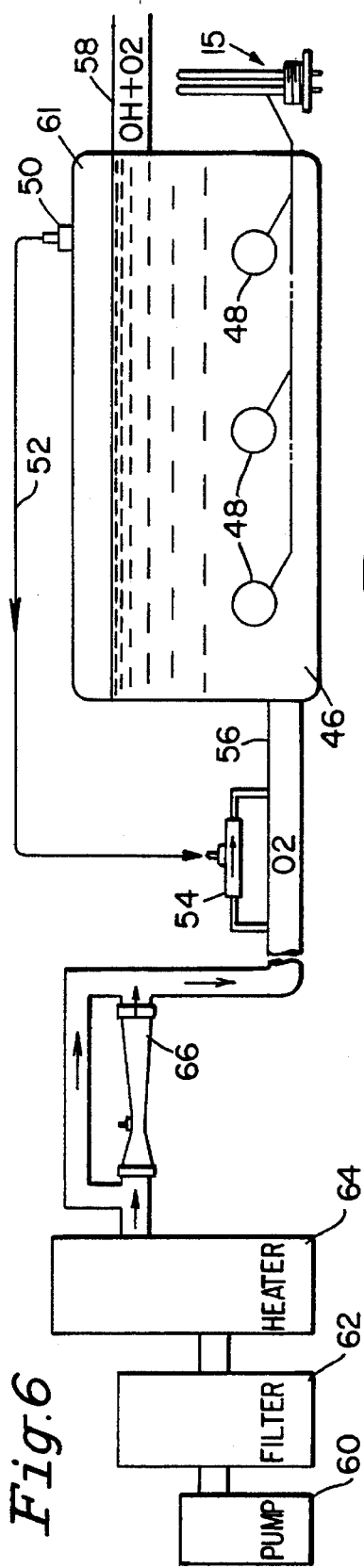
FIG. 6 is a block diagram indicating the positioning of the embodiment of the present invention that is used in connection with large bodies in a recirculation system.

FIG. 6 illustrates the placement of the tank 46 containing multiple devices 10 in accordance with the embodiment illustrated in FIG. 3. In this embodiment the tank 46 is located in the water flow line after pump 60, filter 62, heater 64, venturi oxygen injector 66 and oxygen injection system 54. In this manner, maximum oxygen levels are maintained in the water in the supply line 56 upon introduction into the tank 46 such that, after the operation of devices 10, all oxygen in the water in the return line 58 is dissolved.

Figure 7:
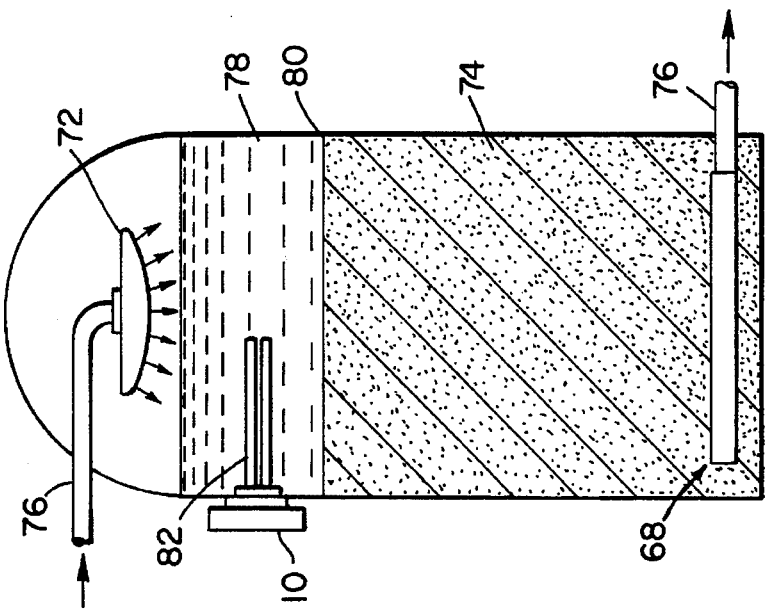
FIG. 7 is a cutaway side view of another embodiment of the present invention used in connection with a standard pool sand filter.

FIG. 7 illustrates yet another alternative embodiment of the present invention. In this embodiment, device 10 has been incorporated into a known sand type filter 68 currently in use in connection with many pool water purification systems. The sand filter typically has a water supply line 70 that feeds water to be filtered to and through a distribution device 72 which then drops the water onto a quantity of sand 74. Under the force of gravity, the water filters through the sand 74 and eventually exits through outlet port 76 for ultimate return to the pool or other body of water. Typically in such systems an amount of water 78 tends to collect above the sand level 80 prior to passing through the sand 74.

In accordance with this embodiment of the present invention, a single device 10 is accommodated through an opening 82 in the side of the filter 68 in the water level 78. Device 10 is connected to the filter 68 in the manner previously described in connection with the other embodiments. Since the water tends to collect and remain above the sand level 80 in the region of device 10 for a reasonably long period of time, this provides a highly advantageous environment for utilization of device 10 to purify the water by forming free oxygen radicals since the contact time and, therefore, ORP is very high.

Once given the above disclosure, many other features, modifications, improvements and embodiments will become apparent to the skilled artisan. Such features modifications, improvements and additional embodiments are therefore considered to be part of the invention, the scope of which is to be determined by the following claims.

We claim:

1. A method of killing bacteria and algae by the formation of free radical forms of oxygen in a closed recirculating water system having a water source, a water filter, a circulating pump and a water circulating pipe connecting the circulating pump, the water filter and an inlet and an outlet to the pool filter and a housing connected to said pipe comprising the steps of:

introducing a pair of electrodes consisting essentially of carbon and ash into the housing such that a substantially unrestricted flow of water is possible through said housing;

providing a flow of water from the water source throughout said pipe, said filter, said housing and past said pair of electrodes such that the entire outer surface of each electrode is constantly in contact with said flow of water;

providing DC current to said electrodes;

creating free radical forms of oxygen in the water between said electrodes;

circulating all of the free radical forms of oxygen created by said electrode assembly from said housing through said outlet of said pipe and into said closed water source; and continuously resupplying water from said water source with said free radical forms of oxygen therein back to said inlet of said pipe and to said electrodes.

2. The method of claim 1 further comprising the step of injecting oxygen into the flow of water.

3. The method of claim 2 wherein said step of injecting oxygen occurs prior to said step of creating free radical forms of oxygen.

4. The method of claim 1 further comprising the steps of;

introducing a second pair of carbon and ceramic ash electrodes into the housing;

providing a flow of water in said housing around and between said second pair of electrodes;

providing DC current to said second pair of electrodes to generate an electrical field between said second pair of electrodes; and creating free radical forms of oxygen in the water between the electrodes of said second pair of electrodes.

5. The method of claim 1 wherein said flow of water from said water source throughout said pipe, said filter, said housing and past said electrodes in said water flow providing step is at a rate of greater than about 5 feet per second.

6. The method of claim 1 wherein a nominal charge of about 10 volts at about 2.5–4.4 amps is provided in said step of providing DC current to said electrodes.

7. An apparatus for the continuous formation and circulation of oxygen radicals to kill bacteria and algae in a closed recirculating recreational water system, having a water source comprising:

a DC power supply;

a water filter;

a pipe connected to said water filter having an inlet and an outlet to the water system and being otherwise completely closed from said water system;

a housing that is completely closed to the environment outside said water system connected to said pipe;

an electrode assembly within said housing that allows substantially unrestricted flow in said pipe and housing, said electrode assembly being connected to and activated by said DC power supplied by said power supply;

said electrode assembly further comprising a pair of electrodes in a spaced parallel relationship which create oxygen radicals in the water in said housing passing between said electrodes when supplied with DC power from said DC power supply to kill bacteria and algae in said water system, each of said electrodes being comprised throughout of carbon and ash;

means for continuously and substantially immediately circulating all of the oxygen radicals created by said electrode assembly from said housing chamber through said outlet of said pipe and into said closed water source; and means for continuously recirculating water from said water source with said oxygen radicals deposited therein back to said inlet of said pipe and said electrode assembly.

8. The apparatus of claim 7 further comprising an oxygen injector.

9. The apparatus of claim 8 further comprising;

a second electrode assembly further comprising a pair of electrodes, said electrodes consisting essentially of carbon and ash and being in spaced parallel relationship which when activated cause an electrical charge to flow between said electrodes, thereby creating oxygen radicals in water passing between said electrodes.

10. The apparatus of claim 7 further comprising;

a second electrode assembly further comprising a pair of electrodes, said electrodes consisting essentially of carbon and ash and being in spaced parallel relationship which when activated cause an electrical charge to flow between said electrodes, thereby creating oxygen radicals in water passing between said electrodes.

11. The apparatus of claim 7 wherein said electrode assembly further comprises;

a threaded end connecting said pair of electrodes at one end.

12. The apparatus of claim 7 wherein said water filter is a sand filter.

13. The apparatus of claim 7 wherein said electrode assembly is located between said inlet of said pipe and said water filter.

14. The apparatus of claim 7 wherein said electrode assembly is removable.

15. The apparatus of claim 7 wherein each electrode contains about 80% carbon and about 20% ceramic ash.

16. The apparatus of claim 7 wherein said circulating means and said recirculating means maintain a constant flow of greater than about 5 feet per second throughout said pipe and said housing and past said electrode assembly.

17. The apparatus of claim 7 wherein said DC power supply supplies a nominal charge of about 10 volts at about 2.5–4.4 amps to said electrodes.

* * * * *